(12) United States Patent
Belur

(10) Patent No.: US 12,456,870 B2
(45) Date of Patent: Oct. 28, 2025

(54) MICROINVERTERS FOR PV APPLICATIONS

(71) Applicant: Enphase Energy, Inc., Petaluma, CA (US)

(72) Inventor: Raghuveer R. Belur, Los Altos, CA (US)

(73) Assignee: Enphase Energy, Inc., Petaluma, CA (US)

( * ) Notice: Subject to any disclaimer, the term of this patent is extended or adjusted under 35 U.S.C. 154(b) by 13 days.

(21) Appl. No.: 18/637,930

(22) Filed: Apr. 17, 2024

(65) Prior Publication Data

US 2024/0364117 A1    Oct. 31, 2024

Related U.S. Application Data

(60) Provisional application No. 63/462,411, filed on Apr. 27, 2023.

(51) Int. Cl.
*H02J 3/46* (2006.01)
*G05F 1/67* (2006.01)
*H02J 3/38* (2006.01)
*H02S 40/32* (2014.01)

(52) U.S. Cl.
CPC ............ *H02J 3/46* (2013.01); *G05F 1/67* (2013.01); *H02J 3/381* (2013.01); *H02S 40/32* (2014.12); *H02J 2300/26* (2020.01)

(58) Field of Classification Search
CPC .......... H02J 3/46; H02J 3/381; H02J 2300/26; H02S 40/32; G05F 1/67; Y02E 10/56
USPC ............................................... 307/85
See application file for complete search history.

(56) References Cited

U.S. PATENT DOCUMENTS 9,923,374 B2 * 3/2018 Judkins .................. H02S 50/00

* cited by examiner

*Primary Examiner* — Hal Kaplan
(74) *Attorney, Agent, or Firm* — Moser Taboada

(57) ABSTRACT

A photovoltaic system is provided herein and comprises an array of photovoltaic modules, a plurality of microinverters coupled to the array of photovoltaic modules, and a controller configured to disconnect a primary microinverter from a microgrid during MPP curve sweep analysis, perform the MPP curve sweep analysis for the primary microinverter, and shift a pre-sweep load of the primary microinverter to other microinverters in the array of photovoltaic modules.

12 Claims, 3 Drawing Sheets

MICROINVERTERS FOR PV APPLICATIONS

CROSS-REFERENCE TO RELATED APPLICATIONS

The present application claims the benefit of and priority to U.S. Provisional Application Ser. No. 63/462,411, filed on Apr. 27, 2023, the entire contents of which is incorporated herein by reference.

BACKGROUND OF THE DISCLOSURE

Field of the Disclosure

Embodiments of the present disclosure relate generally to power conversion, and, for example, to microinverters that are configured to perform maximum power point curve analysis for additional power production.

Description of the Related Art

Power converters (microinverters) play an indispensable role in various electrical power applications, such as converting DC from renewable energy resources to power-grid compliant AC. Topologies for the power converters are designed with various considerations, including cost and efficiency. For example, in a situation where excess power converter production cannot be used, knowing how much additional production capacity is available may be desirable, e.g., in a grid outage or no-export situation, and where connected batteries (if any) are full or otherwise set to not charge. Additionally, a user (e.g., a consumer) may wish to know what, if any, additional production is available because the user may want to minimize power consumption during an outage to conserve energy, but because the microinverters are curtailing output the user may actually be able to run more loads without any impact on the batteries and/or other backup sources. Without specific knowledge of how much additional power is available, the user may have to gradually increase loads and watch for battery/backup discharge or increase loads to a point where the microinverters fail to satisfy all loads.

Therefore, there is a need for improved microinverters that are configured to perform maximum power point curve analysis for additional power production.

SUMMARY

In accordance with at least some aspects of the disclosure, a photovoltaic system comprises an array of photovoltaic modules, a plurality of microinverters coupled to the array of photovoltaic modules, and a controller configured to disconnect a primary microinverter from a microgrid during (power point tracking) MPP curve sweep analysis, perform the MPP curve sweep analysis for the primary microinverter, and shift a pre-sweep load of the primary microinverter to other microinverters in the array of photovoltaic modules.

In accordance with at least some aspects of the disclosure a method for performing maximum power point curve analysis for additional power production comprises disconnecting a primary microinverter of a plurality of microinverters coupled to an array of photovoltaic modules from a microgrid during MPP curve sweep analysis, performing the MPP curve sweep analysis for the primary microinverter, and shifting a pre-sweep load of the primary microinverter to remaining microinverters of the plurality of microinverters.

In accordance with at least some aspects of the disclosure a photovoltaic system comprises an array of photovoltaic modules, a plurality of microinverters coupled to the array of photovoltaic modules, and a controller configured to automatically change an output of a primary microinverter of the plurality of microinverters during MPP curve sweep analysis, perform the MPP curve sweep analysis for the primary microinverter, and automatically change an output of remaining microinverters of the plurality of microinverters.

In accordance with at least some aspects of the disclosure a method for performing maximum power point curve analysis for additional power production comprises automatically changing an output of a primary microinverter of a plurality of microinverters coupled to an array of photovoltaic modules during MPP curve sweep analysis, performing the MPP curve sweep analysis for the primary microinverter, and automatically changing an output of remaining microinverters of the plurality of microinverters.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Methods and apparatus described herein provide improved microinverters that are configured to perform maximum power point curve analysis for additional power production. For example, a photovoltaic system comprises an array of photovoltaic modules, a plurality of microinverters coupled to the array of photovoltaic modules, and a controller configured to disconnect a primary microinverter from a microgrid during power point tracking (MPP) curve sweep analysis, perform the MPP curve sweep analysis for the primary microinverter, and shift a pre-sweep load of the primary microinverter to other microinverters in the array of photovoltaic modules. Additionally, a method for performing maximum power point curve analysis for additional power production comprises disconnecting a primary microinverter of a plurality of microinverters coupled to an array of photovoltaic modules from a microgrid during MPP curve sweep analysis, performing the MPP curve sweep analysis for the primary microinverter, and shifting a pre-sweep load of the primary microinverter to remaining microinverters of the plurality of microinverters. The methods and apparatus described herein provide more information to a consumer during an outage and allows the user to use more loads in a home without any impact on battery or other backup source.

Figure 1:
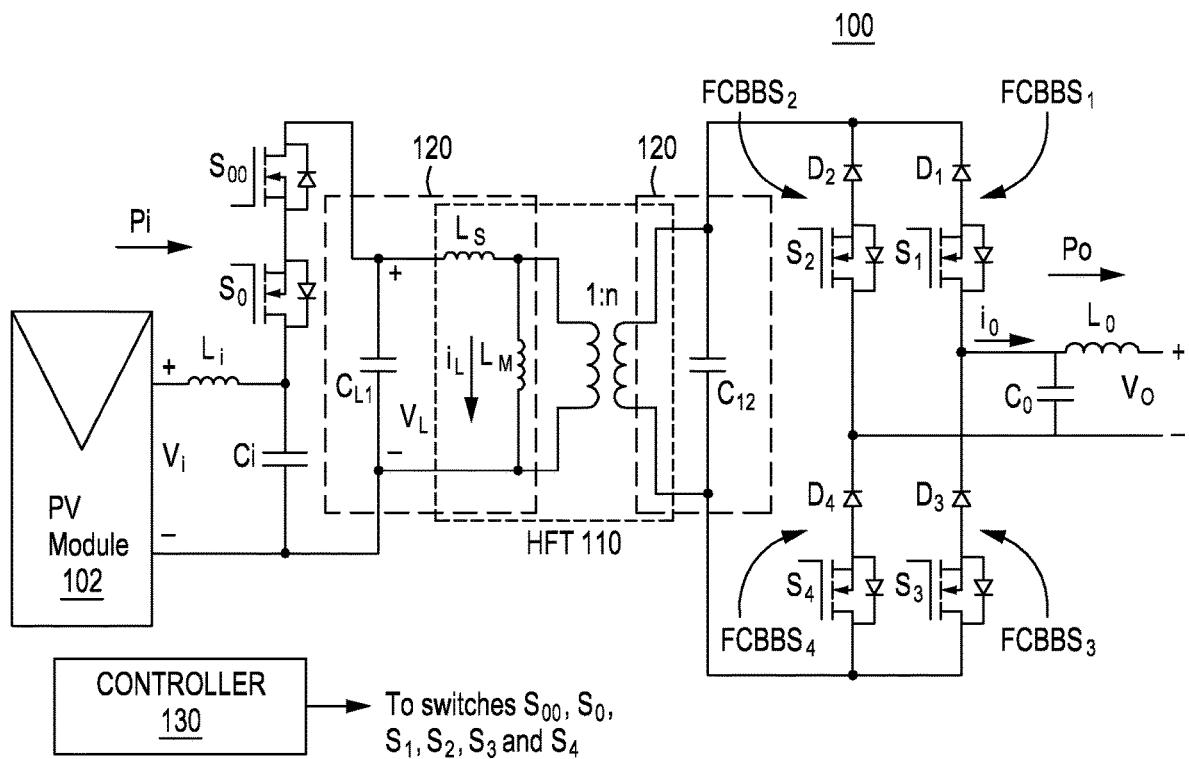
FIG. 1 is a block diagram of a power converter in accordance with one or more embodiments of the present disclosure.

FIG. 1 is a block diagram of a power converter 100 in accordance with one or more embodiments of the present disclosure. This diagram only portrays one variation of the myriad of possible system configurations. The present disclosure can function in a variety of power generation environments and systems.

The power converter 100 is a partial-resonant DC-to-single-phase AC converter with galvanic isolation. The power converter 100 comprises an input switch bridge comprising two back-to-back metal-oxide-semiconductor field-effect transistors, (MOSFETs), (or bidirectional-conducting unidirectional-blocking) $S_{00}$ and $S_0$, (which may in other embodiments be wide-bandgap devices). The $S_0$ drain and a first terminal of an inductor $L_i$ are each coupled to a first terminal of a capacitor $C_i$; a second terminal of the inductor $L_i$ and a second terminal of the capacitor $C_i$ are respectively coupled to positive and negative terminals of a DC input, such as a PV module 102 (photovoltaic module). A partial-resonant link 120 is formed by a small magnetizing inductance $L_M$ of a transformer 110 (a high-frequency transformer (HFT)) along with very small AC capacitors $C_{L1}$ and $C_{L2}$ (it is assumed that leakage inductance of the transformer 110—represented in FIG. 1 as $L_S$—is negligible). In some embodiments, $C_{L2}$ may be a reflected capacitance. The magnetizing inductance $L_M$ (and any leakage inductance $L_S$) and the AC capacitor $C_{L1}$ are each coupled across the series combination of the switches $S_{00}$, $S_0$, and the capacitor $C_i$.

The secondary winding of the transformer 110 is coupled across an output bridge which connects the output load to the inductive link. The output bridge comprises four forward-conducting bidirectional-blocking (FCBB) switches. In some embodiments, such as the embodiment depicted in FIG. 1, each FCBB switch may be composed of a series combination of a switch and a diode (switches $S_1$, $S_2$, $S_3$, $S_4$ and corresponding diodes $D_1$, $D_2$, $D_3$, $D_4$ forming corresponding FCBB switches $FCBBS_1$, $FCBBS_2$, $FCBBS_3$, $FCBBS_4$ in FIG. 1); in other embodiments, a forward-conducting bidirectional-blocking switch may be composed of back-to-back switches (or AC switch), or a switch with bidirectional capability. The switches $FCBBS_2$ and $FCBBS_4$ are coupled to one another in series, and the switches $FCBBS_1$ and $FCBBS_3$ are coupled to one another in series; these series combinations are coupled across the secondary winding of the transformer 110. The transformer 110 has a 1:n turns ratio, and the capacitor $C_{L2}$ is also present across the transformer secondary winding.

A first terminal of an output capacitor $C_O$ is coupled to the drain of the switch $FCBBS_1$ and to a first terminal of an output inductor $L_O$; a second terminal of the output capacitor $C_O$ is coupled to the drain of the switch $FCBBS_2$. Output terminals (i.e., a second terminal of the $L_O$ and the second terminal of the capacitor $C_O$) may be coupled to any suitable system or device, such as a single-phase AC power line. Gate terminals of each of the switches $S_{00}$, $S_0$, and $FCBBS_1$-$FCBBS_4$, are coupled to a controller 130 for operatively controlling the switches.

The power converter 100 functions in buck-boost mode of operation and transfers power entirely through the link inductor, which is charged and discharged each cycle. The power converter 100 has a lower total switch-count than conventional four-quadrant inductive-link converters performing similar functions (e.g., universal power converters). In contrast to these conventional converters that utilize four-quadrant link operation, where the link current can be positive and negative, the power converter 100 restricts the link current to one direction, thereby allowing the power converter 100 to have a smaller number of switches and a simpler control algorithm. Further, the power converter 100 does not utilize any switches around the transformer 110, in contrast to topologies used in a solid-state transformer (SST) applications. The topology of the power converter 100 improves the power density of the converter over conventional topologies such as four-quadrant inductive-link converters and SST converters, and thereby enables a lower final cost of production than for conventional topologies.

In one or more embodiments, the transformer turns ratio 1:n may be 1:9, the inductance $L_S$ may be negligible, and the power converter components may have values on the order of: $C_{L1}$=1 nF; $C_{L2}$=$C_{L1}$/$n^2$=0.01234 nF (where n=9); $C_o$=1.8 uF; $L_o$=30 uH; $C_i$=13.2 mH, $L_M$=1.8 uH, and $L_S$=2 nH.

Figure 2:
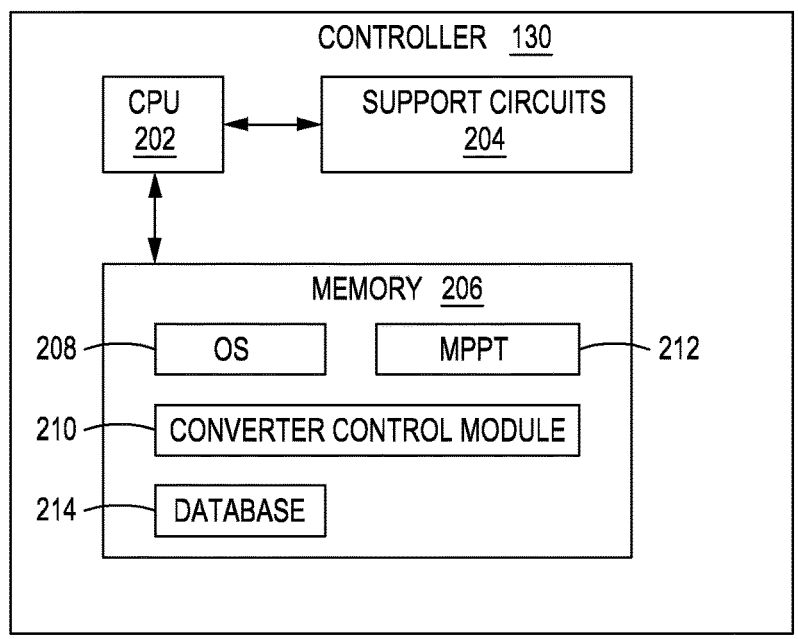
FIG. 2 is a block diagram of a controller in accordance with one or more embodiments of the present disclosure.

FIG. 2 is a block diagram of a controller 130 in accordance with one or more embodiments of the present disclosure. The controller 130 comprises support circuits 204 and a memory 206, each coupled to a CPU 202 (central processing unit). The CPU 202 may comprise one or more conventionally available microprocessors or microcontrollers; alternatively, the CPU 202 may include one or more application specific integrated circuits (ASICs). In other embodiments, the CPU 202 may be a microcontroller comprising internal memory for storing controller firmware that, when executed, provides the controller functionality described herein.

The support circuits 204 are well known circuits used to promote functionality of the CPU 202. Such circuits include, but are not limited to, a cache, power supplies, clock circuits, buses, input/output (I/O) circuits, and the like. The controller 130 may be implemented using a general-purpose computer that, when executing particular software, becomes a specific purpose computer for performing various embodiments of the present disclosure.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the OS 208 (operating system), if necessary, of the controller 130 that can be supported by the CPU capabilities. In some embodiments, the OS 208 may be one of a number of commercially available operating systems such as, but not limited to, LINUX, Real-Time Operating System (RTOS), and the like.

The memory 206 may store various forms of application software, such as a converter control module 210 for controlling operation of the power converter 100 when executed by the controller 130. The memory 206 may also store a database 214 for storing data related to the operation of the power converter 100.

For example, the memory 206 may further store a maximum power point tracking (MPPT) module 212 that, when executed by the controller 130, determines an operating point for biasing the PV module 102 at a maximum power point (MPP). For example, the maximum power point tracking (MPPT) module 212 may comprise a commercially-available MPPT module for providing a global maximum power point tracking for the PV module 102. For example, the maximum power point tracking (MPPT) module 212 algorithm determines a DC input current demand signal in order to operate the PV module 102 at a loading that produces a maximum output power for a given solar irradiance. For example, input and output voltages are determined by the PV module 102 and AC grid voltages, while a DC input current is determined by a PV MPPT algorithm used to extract a maximum power from the PV module 102. In at least some embodiments, the converter control module 210 is responsible for determining an AC output current to keep the capacitor voltage regulated to a target value.

Figure 3:
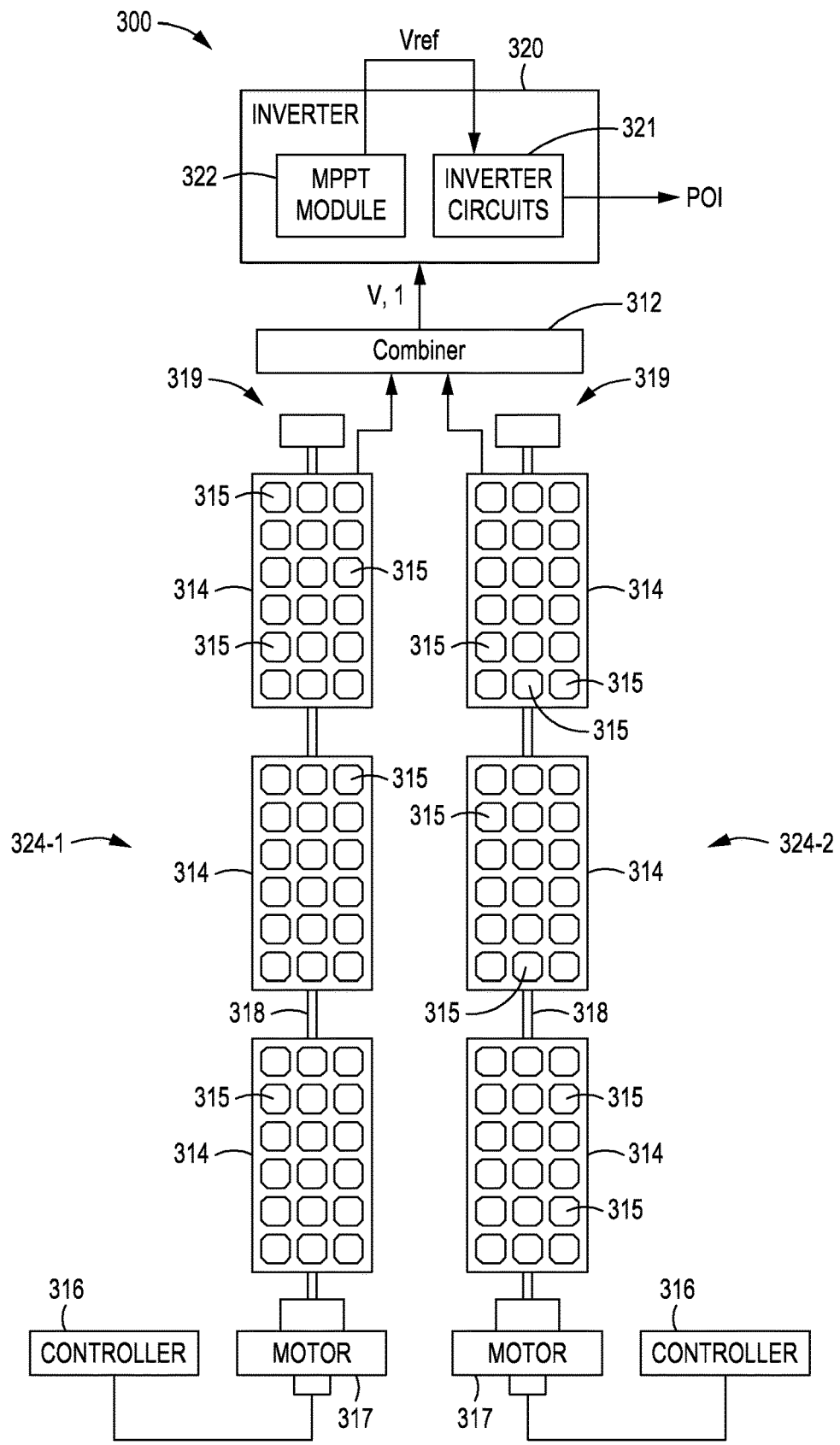
FIG. 3 is a schematic diagram of a photovoltaic system in accordance with one or more embodiments of the present disclosure.

FIG. 3 is a schematic diagram of a photovoltaic system 300 in accordance with one or more embodiments of the present disclosure. The photovoltaic system 300 includes a microinverter 320 (e.g., the power converter 100, photovoltaic microinverter) and a plurality of solar cells 315. The plurality of solar cells 315 convert solar radiation into electrical energy. The plurality of solar cells 315 may be commercially available solar cells, such as those available from Enphase® Corporation of Petaluma, Calif., for example. In FIG. 3, a group of the plurality of solar cells 315 is mounted on a photovoltaic module 314. The plurality of solar cells 315 may also be mounted or packaged differently without detracting from the merits of the present disclosure.

A string 324 (i.e., 324-1, 324-2) of photovoltaic modules 314 may be mounted on a solar tracker 319. Two strings 324 are shown for illustration, but the photovoltaic system 300 may have one or more strings 324. The string 324 may comprise the plurality of solar cells 315 that are electrically connected in series.

The solar tracker 319 may comprise a torque tube 318, a motor 317, and a solar tracker controller 316. The torque tube 318 may comprise a rigid tube or other support onto which the photovoltaic modules 314 are attached. The motor 317 rotates the torque tube 318 to rotate the photovoltaic modules 314. The solar tracker controller 316 may be configured to drive the motor 317 to orient the photovoltaic modules 314 towards the sun for optimum solar illumination. The solar tracker controller 316 may position the photovoltaic modules 314 based on the date and time. The solar tracker controller 316 may communicate with the microinverter 320 and/or other device configured for MPP tracking by wired or wireless communication. In one embodiment, the solar tracker controller 316 is configured to provide the microinverter 320 position information that is indicative of the orientation of the solar cells 315 relative to solar illumination. The position information may comprise a reading of a rotational position of the motor 317 or motor setpoint of the motor 317, for example.

A combiner box 312 provides junctions where the outputs of the plurality of solar cells 315 may be combined and/or connected to other components. In FIG. 3, the combiner box 312 provides the combined voltage (V) and combined current (I) generated by the plurality of solar cells 315 to the microinverter 320.

The microinverter 320 converts direct current (DC) generated by the plurality of solar cells 315 to alternating current (AC). The photovoltaic system 300 may have a plurality microinverters but only one is shown in FIG. 3 for clarity. In FIG. 3, the microinverter 320 comprises inverter circuits 321 and an MPP tracking module 322 (e.g., the maximum power point tracking (MPPT) module 212). The inverter circuits 321 may comprise electrical circuits for converting DC from the plurality of solar cells 315 to AC suitable for delivery to a point of interconnection (POI), such a utility meter or connection to a utility grid, for example. The inverter circuits 321 may employ electrical circuits employed by commercially available photovoltaic inverters. The MPP tracking module 322 may comprise control logic for performing MPP tracking. The MPP tracking module 322 may be implemented in software (e.g., computer-readable program code stored in memory and executed by a processor), hardware (e.g., ASIC, hardwired logic), or combination of hardware and software (e.g., firmware). The MPP tracking module 322 may be configured to perform a normal MPP tracking method, which is so named because it is configured to perform MPP tracking under normal operating conditions. The normal MPP tracking method may comprise the perturb and observe (P&O) method and the incremental conductance (IncC) method, for example. The MPP tracking module 322 may be configured to modify the normal MPP tracking method in response to detecting shading of the plurality of solar cells 315 and/or when certain temporal conditions are met. The modification may involve use of another MPP tracking method instead of the normal MPP tracking method, changing a value of a variable (e.g., increment step size or decrement step size) of the normal MPP tracking method, performing a full I-V curve sweep, and/or other ways of changing the processing behavior, and accordingly the output, of the normal MPP tracking method. The MPP tracking module 322 may be configured to receive from a solar tracker controller 316 position information indicative of orientation of the plurality of solar cells 315 relative to solar illumination.

The MPP tracking module 322 is implemented in the microinverter 320. The MPP tracking module 322 reads the voltage and current of the plurality of solar cells 315, performs MPP tracking using the voltage and current levels of the plurality of solar cells 315 to determine a voltage setpoint in the form of a voltage reference $V_{ref}$ and provides the voltage reference $V_{ref}$ to the inverter circuits 321. The inverter circuits 321 change the impedance presented to the plurality of solar cells 315, or perform other actions depending on the inverter, to induce the plurality of solar cells 315 to generate a voltage at a same level as the reference voltage $V_{ref}$. It is to be noted that the reference voltage $V_{ref}$ serves as a setpoint, but the actual voltage operating point of the photovoltaic system 300 may differ from the reference voltage $V_{ref}$. As can be appreciated, the functionality of the MPP tracking module 322 may also be implemented in a device other than a photovoltaic inverter.

The inventor has found that performing a sweep of a maximum power point (MPP) curve on a first microinverter (e.g., the power converter 100 or the microinverter 320), which can be part of an array of PV modules and corresponding power converters, can be used to determine a power output and maximum power output and increase production of the other microinverters in the array of PV modules to dynamically compensate for a loss of power from the first microinverter during the sweep. For example, apparatus and methods described herein are configured to do a sweep of an MPP curve for a first microinverter, with the intent of identifying how much power is available above a pre-sweep output. Because a microinverter may be satisfying an active load, the decrease in power production that is seen at the output of the microinverter is shifted to the other microinverters in the array of PV modules during the period of the sweep. Thus, each microinverter in an array of PV modules may be individually (or in groups) analyzed according to the same logic, and a sum of all excess power available may be communicated to a user or other system maintainer. For purposes described herein, the term first microinverter or primary microinverter may be a single or a group of microinverters. In at least some embodiments, the MPP curve sweep analysis can be performed using the methods described in commonly-owned U.S. Pat. No. 9,923, 374, the entire contents of which is incorporated herein by reference.

As noted above, the inventor provides herein improved microinverters that are configured to perform MPP curve analysis for additional power production. For example, there are two ways to implement a requirement that other microinverters compensate for a temporary decrease in production by a primary microinverter. In at least some embodiments, the primary microinverter (e.g., the microinverter 320) may undergo MPP curve sweep analysis, but an output of the primary microinverter is completely disconnected from the microgrid while performing MPP curve sweep analysis. Thus, in such embodiments, an entire pre-sweep load would be shifted to the other microinverters in the array of PV modules. Alternatively, in at least some embodiments, the primary microinverter is configured to dynamically (automatically, e.g., the algorithm compensates for power loss of the micros-under-eval without manual intervention) change its output as it undergoes an MPP curve sweep analysis, and the other microinverters are configured to dynamically change their output to accommodate the decrease.

Figure 4:
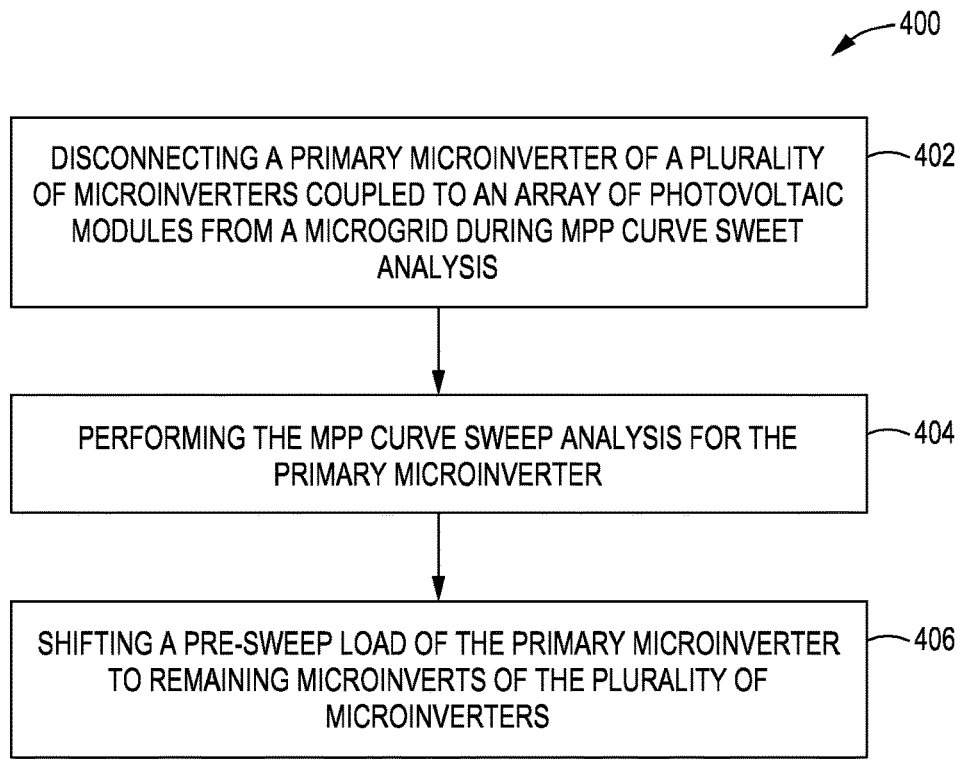
FIG. 4 is a flowchart of a method for performing maximum power point curve analysis for additional power production in accordance with one or more embodiments of the present disclosure.

FIG. 4 is a flowchart of a method 400 for performing maximum power point curve analysis for additional power production in accordance with one or more embodiments of the present disclosure.

For example, at 402, the method 400 comprises disconnecting a primary microinverter from a microgrid. In at least some embodiments, the controller 130 can be configured to disconnect the microinverter 320 from the microgrid using one or more of the switches of FIG. 1.

Next, at 404, the method 400 comprises performing MPP curve sweep analysis to determine an amount of excess power that is available at the microinverter. In at least some embodiments, under control of the controller 130, the MPP tracking module 322 (e.g., the maximum power point tracking (MPPT) module 212) can be used to perform the MPP curve sweep analysis.

As noted above, the primary microinverter is completely disconnected from the microgrid while performing MPP curve sweep analysis. Typically, a conventional photovoltaic system will observe a loss of power (e.g., if the primary microinverter is satisfying an active load) while the primary microinverter is performing MPP curve sweep analysis. In accordance with the present disclosure, however, next, at 406, since the primary microinverter is disconnected from the microgrid, method 400 comprises shifting the entire pre-sweep load to the other microinverters (e.g., the remaining microinverters) in the array of PV modules. In at least some embodiments, the other microinverters in the array of PV modules are configured to automatically detect when the primary microinverter is disconnected from the microgrid.

Next, at 408 (optional), the method 400 comprises at least one of storing or communicating the excess power available and determined during the MPP curve sweep analysis. In at least some embodiments, 402-406 can be performed for each of the microinverters (individually or in groups) in an array of microinverters in an array of PV modules and analyzed according to the same logic, and a sum of all excess power available may be stored/communicated to a user or other system maintainer.

Figure 5:
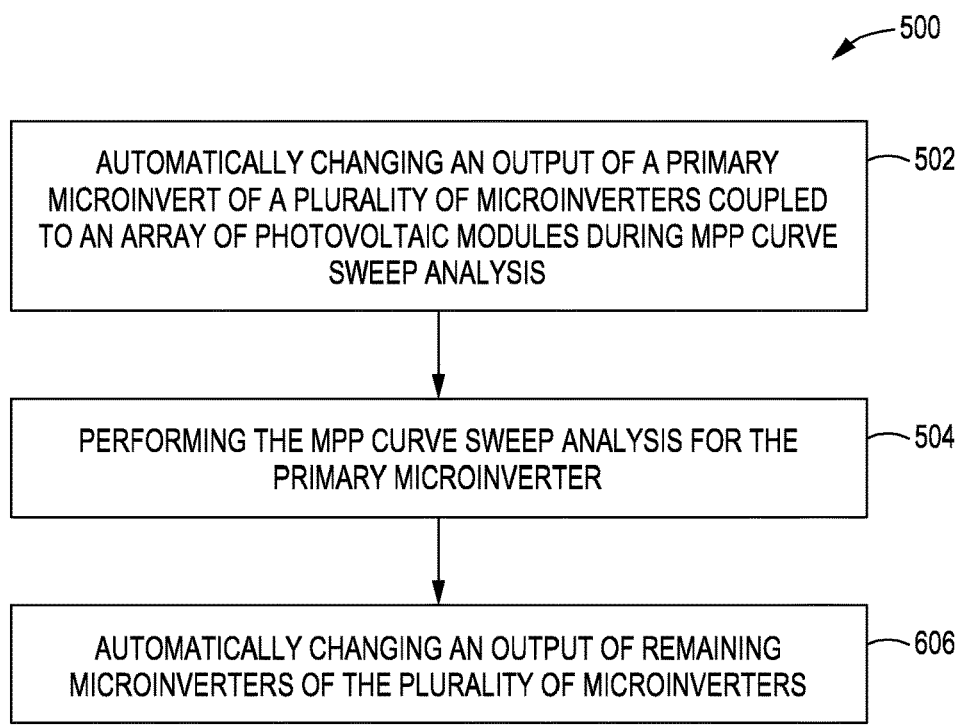
FIG. 5 is a flowchart of a method for performing maximum power point curve analysis for additional power production in accordance with one or more embodiments of the present disclosure.

FIG. 5 is a flowchart of a method for performing maximum power point curve analysis for additional power production in accordance with one or more embodiments of the present disclosure. For example, unlike the method 400, at 502, the method 500 comprises dynamically (automatically) changing the primary microinverter output (e.g., decreasing the output power) as it undergoes an MPP curve sweep analysis. In at least some embodiments, the controller 130 can be configured to dynamically change the microinverter 320 output using one or more of the switches of FIG. 1 as it undergoes an MPP curve sweep analysis.

Next, at 504, the method 500 comprises performing MPP curve sweep analysis to determine an amount of excess power that is available at the microinverter. In at least some embodiments, under control of the controller 130, the MPP tracking module 322 (e.g., the maximum power point tracking (MPPT) module 212) can be used to perform the MPP curve sweep analysis.

Next, at 506, since the primary microinverter's output is being dynamically changed, the method 500 comprises dynamically changing the other microinverters output (e.g., increase the output power) to accommodate the decrease. In at least some embodiments, the other microinverters in the array of PV modules are configured to automatically detect when the primary microinverter's output is being dynamically changed.

Next, at 508 (optional), the method 500 comprises at least one of storing or communicating the excess power available determined during the MPP curve sweep analysis. In at least some embodiments, 502-506 can be performed for each of the microinverters (individually or in groups) in an array of microinverters in an array of PV modules and analyzed according to the same logic, and a sum of all excess power available may be stored/communicated to a user or other system maintainer.

While the foregoing is directed to embodiments of the present disclosure, other and further embodiments of the disclosure may be devised without departing from the basic scope thereof.

What is claimed is:

1. A photovoltaic system, comprising:
   an array of photovoltaic modules;
   a plurality of microinverters coupled to the array of photovoltaic modules; and
   a controller configured to disconnect a primary microinverter from a microgrid during power point tracking (MPP) curve sweep analysis, perform the MPP curve sweep analysis for the primary microinverter, and shift a pre-sweep load of the primary microinverter to other microinverters in the array of photovoltaic modules.

2. The photovoltaic system of claim 1, wherein the controller is further configured to at least one of store or communicate an excess power available and determined during the MPP curve sweep analysis.

3. The photovoltaic system of claim 1, wherein the controller is further configured to shift an entire pre-sweep load of the primary microinverter to the other microinverters in the array of photovoltaic modules.

4. A method for performing maximum power point (MPP) curve analysis for additional power production, comprising:
   disconnecting a primary microinverter of a plurality of microinverters coupled to an array of photovoltaic modules from a microgrid during MPP curve sweep analysis;
   performing the MPP curve sweep analysis for the primary microinverter; and
   shifting a pre-sweep load of the primary microinverter to remaining microinverters of the plurality of microinverters.

5. The method of claim 4, further comprising at least one of storing or communicating an excess power available and determined during the MPP curve sweep analysis.

6. The method of claim 4, further comprising shifting an entire pre-sweep load of the primary microinverter to remaining microinverters.

7. A photovoltaic system, comprising:
an array of photovoltaic modules;
a plurality of microinverters coupled to the array of photovoltaic modules; and
a controller configured to automatically change an output of a primary microinverter of the plurality of microinverters during power point tracking (MPP) curve sweep analysis, perform the MPP curve sweep analysis for the primary microinverter, and automatically change an output of remaining microinverters of the plurality of microinverters.

8. The photovoltaic system of claim 7, wherein the controller is further configured to at least one of store or communicate an excess power available and determined during the MPP curve sweep analysis.

9. The photovoltaic system of claim 7, wherein an automatic change in the output of the primary microinverter is a decrease in output and automatic change in the output of remaining microinverters is an increase in output.

10. A method for performing maximum power point curve analysis for additional power production, comprising:
automatically changing an output of a primary microinverter of a plurality of microinverters coupled to an array of photovoltaic modules during power point tracking (MPP) curve sweep analysis;
performing the MPP curve sweep analysis for the primary microinverter; and
automatically changing an output of remaining microinverters of the plurality of microinverters.

11. The method of claim 10, further comprising at least one of storing or communicating an excess power available and determined during the MPP curve sweep analysis.

12. The method of claim 10, wherein automatically changing the output of the primary microinverter comprises decreasing the output of the primary microinverter and automatically changing the output of remaining microinverters comprises increasing the output of the remaining microinverters.

* * * * *